Figure 1:
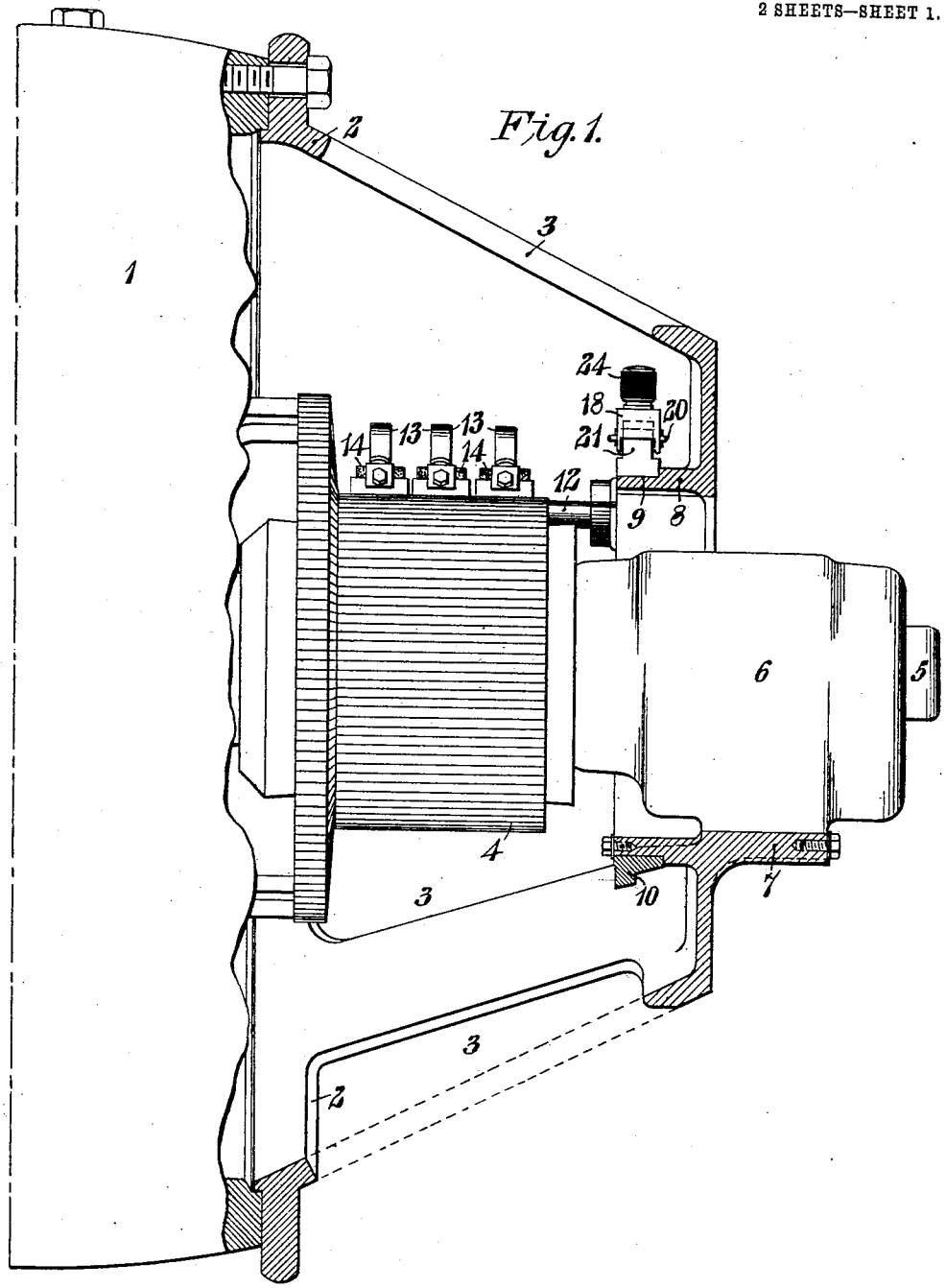

No. 761,985. PATENTED JUNE 7, 1904.
E. R. NORRIS.
ROCKER RING FOR ELECTRICAL MACHINES.
APPLICATION FILED SEPT. 16, 1903.
NO MODEL. 2 SHEETS—SHEET 1.

WITNESSES:
F. H. Miller
J. C. Morse

INVENTOR
Edson R. Norris
BY
Wesley G. Carr
ATTORNEY

No. 761,985. PATENTED JUNE 7, 1904.
E. R. NORRIS.
ROCKER RING FOR ELECTRICAL MACHINES.
APPLICATION FILED SEPT. 16, 1903.
NO MODEL. 2 SHEETS—SHEET 2.
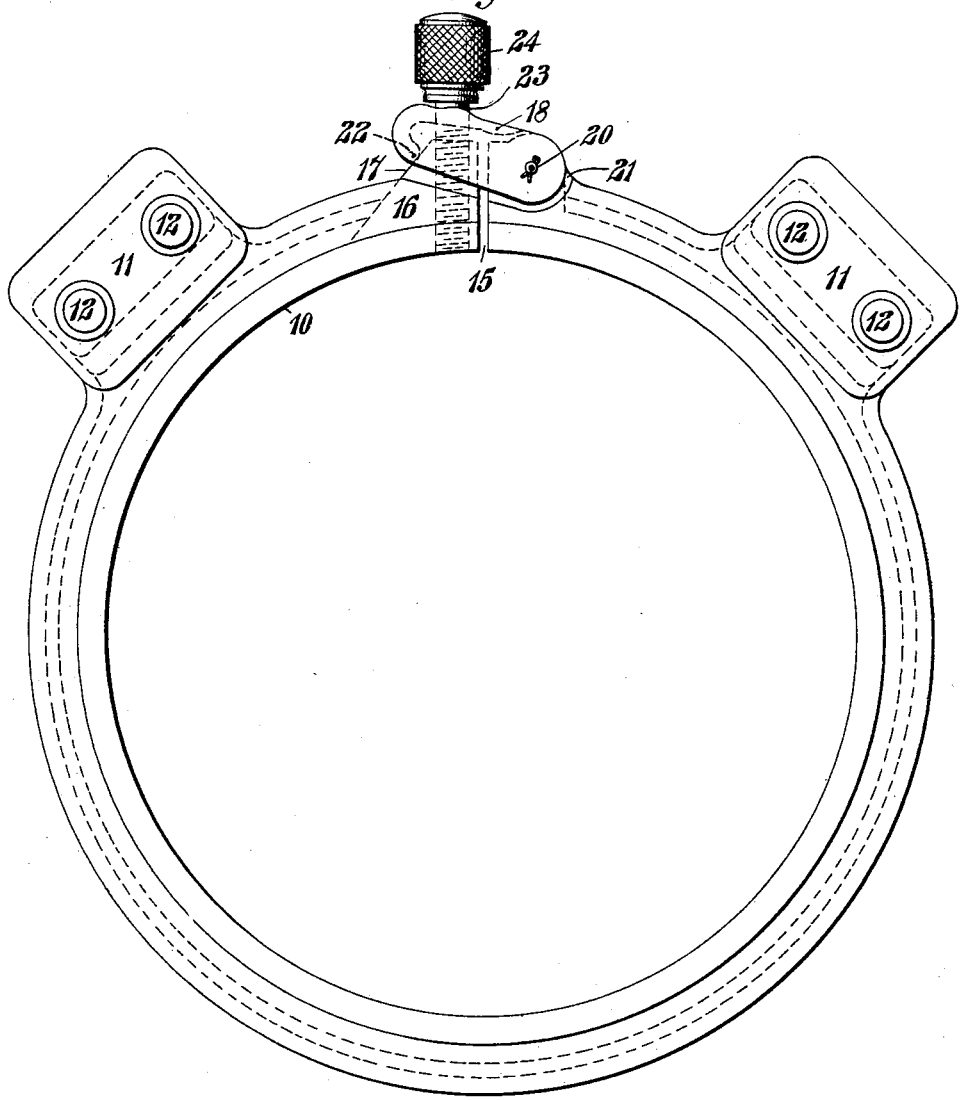

No. 761,985.

Patented June 7, 1904.

UNITED STATES PATENT OFFICE.

EDSON R. NORRIS, OF WILKINSBURG, PENNSYLVANIA, ASSIGNOR TO WESTINGHOUSE ELECTRIC & MANUFACTURING COMPANY, A CORPORATION OF PENNSYLVANIA.

ROCKER-RING FOR ELECTRICAL MACHINES.

SPECIFICATION forming part of Letters Patent No. 761,985, dated June 7, 1904.

Application filed September 16, 1903. Serial No. 173,482. (No model.)

*To all whom it may concern:*

Be it known that I, EDSON RYMAN NORRIS, a citizen of the United States, and a resident of Wilkinsburg, in the county of Allegheny and State of Pennsylvania, have invented a new and useful Improvement in Rocker-Rings for Electrical Machines, of which the following is a specification.

My invention relates to electrical machines, and particularly to rocker-rings for adjustably supporting the brush-holders and brushes of electrical generators or motors.

My invention was primarily designed for use in connection with electric motors, but is also suitable for use in connection with generators and rotary converters, and it is therefore to be regarded as of general application to the extent that it may be used in connection with any electrical machine having brushes and brush-holders circumferential adjustment of which is desired.

In the accompanying drawings, Figure 1 is a view, partially in side elevation and partially in section, of an electrical machine provided with my improvement; and Fig. 2 is an end elevation of a rocker-ring constructed in accordance with my invention.

The motor frame or casing 1, which is provided on its interior with field-magnet pole-pieces and which surrounds the armature, (not shown,) comprises an end bracket or extension 2, here shown as of frusto-conical form and as bolted to the main portion of the casing. This end extension or bracket 2 may be so constructed as to completely inclose the commutator, or it may be of skeleton construction having openings 3, as indicated in Fig. 1.

The commutator-cylinder 4 is supported upon the shaft 5 within the frame extension 2, and the said shaft is provided with suitable bearings 6, one of which is shown in the drawings as supported upon an arm 7, projecting from the part 2.

Projecting inwardly from the outer end of the extension 2 is an annular flange 8, having a reduced bearing-surface 9 at its inner end, on which is supported the rocker-ring 10. This ring is provided on its upper side with two lugs or projections 11, which are approximately ninety degrees apart, and each is provided with a pair of laterally-projecting rods 12, upon which are mounted the brush-holders 13, the brushes 14 being so mounted therein as to make proper engagement with the commutator-cylinder 4.

Midway between the lugs 11 the ring 10 is divided, so that the adjacent ends are normally separated by a comparatively narrow space 15. At one side of the space 15 the ring is provided with a lug 16, having an inclined bearing-surface 17. At the opposite side of the space 15 a clamping-dog 18 is pivotally supported by means of a pin 20, which extends through one end of the dog and through a lug or projection 21 with which the ring is provided. The dog is made hollow or of recessed form, so that it will fit over the lugs 16 and 21, and is provided with a nose 22, which engages the inclined surface 17. A screw-pin 23, having a milled or knurled head 24, projects through a suitable opening in the back or upper surface of the dog and engages a screw-threaded opening in the lug 16 and that portion of the ring to which it pertains.

It will be understood from the construction shown and described that when the ring 10 is mounted upon the bearing 9 it may be clamped securely in position by turning the screw-pin 23 by means of the head 24, since the free end of the clamping-dog will be thus forced inward, so as to act upon the inclined surface 17 and draw the adjacent ends of the ring together to effect the clamping action.

If it is desired for any reason to move the ring annularly in order to adjust the position of the brushes with reference to the commutator-cylinder, this may be readily effected by the same means, it being merely necessary to turn the screw-pin in the opposite direction to that in which it was turned in order to effect the clamping action, thus releasing the ends of the ring, and when it is loosened the pin 23 may be utilized as a handle for adjusting the ring to the position desired, when it may be again clamped, as above described.

Variations in the details of construction may obviously be made without departing from my invention, and I desire it to be understood, therefore, that any such variations which do not change the mode of operation and result are within the scope of the invention.

I claim as my invention—

1. In an electrical machine, a ring divided at one side and having an inclined surface adjacent to the division, in combination with a clamping-dog having one end pivoted to the ring adjacent to the division but opposite the inclined surface and having a nose engaging said surface and a screw-pin projecting through an opening in said dog and making a screw-thread engagement with said ring.

2. An electrical machine having a bracket provided with an annular surface, in combination with a split ring mounted on said annular surface and having an inclined surface adjacent to its opening, of a dog pivoted at one end to the ring at the opposite side of the opening and engaging the inclined surface at its free end and a locking-pin extending through an opening in the dog and screwing into the adjacent portion of the ring.

3. The combination with a split rocker-ring for the brush-holders of electrical machines provided with a lug having a surface that is inclined with reference to the ring-radius, of a clamping device pivoted to said ring and engaging said lug, and a screw-pin projecting through an opening in the clamping device and screwing into the ring.

4. A split rocker-ring for the brush-holders of electrical machines having a clamping-dog pivoted thereto adjacent to the division therein and a manually-operated device for adjusting said ring annularly on its support and for operating said dog to draw the ends of the ring together to clamp it in position.

5. In an electrical machine, the combination with a bracket having an annular surface, of a split rocker-ring mounted on said surface and having a pivoted clamping-dog and manually-operated means for adjusting the ring annularly on its support and for operating the dog to clamp the ring in its adjusted position.

6. A split rocker-ring for electrical machines having clamping members on its respective adjacent ends, one of which is pivotally mounted, and a thumb-screw for operating said members to draw the ends of the ring toward each other.

7. A split rocker-ring for electrical machines having a clamping-dog pivoted to one end and having an inclined-surface lug at its other end with which the free end of the dog engages and an adjusting and clamping screw that extends through an opening in the dog and into the ring-body.

In testimony whereof I have hereunto subscribed my name this 12th day of September, 1903.

EDSON R. NORRIS.

Witnesses:
J. B. WALL,
BIRNEY HINES.